(12) United States Patent
Jung

(10) Patent No.: US 10,956,570 B2
(45) Date of Patent: Mar. 23, 2021

(54) EFFICIENT PROGRAM DEOBFUSCATION THROUGH SYSTEM API INSTRUMENTATION

(71) Applicant: Palo Alto Networks, Inc., Santa Clara, CA (US)

(72) Inventor: Robert Jung, Albuquerque, NM (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 16/725,748

(22) Filed: Dec. 23, 2019

(65) Prior Publication Data

US 2020/0134178 A1    Apr. 30, 2020

Related U.S. Application Data

(63) Continuation of application No. 15/701,331, filed on Sep. 11, 2017, now Pat. No. 10,565,376.

(51) Int. Cl.
| | |
|---|---|
| *G06F 11/30* | (2006.01) |
| *G06F 21/56* | (2013.01) |
| *G06F 3/06* | (2006.01) |
| *H04L 29/06* | (2006.01) |
| *G06F 12/0802* | (2016.01) |

(52) U.S. Cl.
CPC .............. *G06F 21/56* (2013.01); *G06F 3/062* (2013.01); *G06F 3/0641* (2013.01); *G06F 3/0673* (2013.01); *G06F 11/3034* (2013.01); *G06F 12/0802* (2013.01); *G06F 21/562* (2013.01); *G06F 2212/1052* (2013.01)

(58) Field of Classification Search
CPC ...... G06F 21/56; G06F 21/562; G06F 21/564; G06F 21/566; G06F 11/3034; G06F 12/0802; G06F 3/0641; G06F 3/0673; G06F 3/062; G06F 2212/1052
See application file for complete search history.

(56) References Cited

U.S. PATENT DOCUMENTS

| | | | |
|---|---|---|---|
| 8,266,698 B1 | 9/2012 | Seshardi | |
| 8,875,295 B2 | 10/2014 | Lutas | |
| 9,104,867 B1 * | 8/2015 | Thioux | ................... G06F 21/56 |
| 9,292,417 B2 | 3/2016 | Salsamendi | |
| 9,507,939 B1 | 11/2016 | Lukacs | |
| 9,584,541 B1 | 2/2017 | Weinstein | |
| 2007/0150957 A1 | 6/2007 | Hartrell | |
| 2012/0255012 A1 | 10/2012 | Sallam | |

(Continued)

OTHER PUBLICATIONS

Garfinkel et al., A Virtual Machine Introspection Based Architecture for Intrusion Detection, 2003.

*Primary Examiner* — Nelson S. Giddins
(74) *Attorney, Agent, or Firm* — Van Pelt, Yi & James LLP

(57) ABSTRACT

Techniques for efficient program deobfuscation through system application program interface (API) instrumentation are disclosed. In some embodiments, a system/process/computer program product for efficient program deobfuscation through system API instrumentation includes monitoring changes in memory after a system call event during execution of a malware sample in a computing environment; and generating a signature based on an analysis of the monitored changes in memory after the system call event during execution of the malware sample in the computing environment.

20 Claims, 13 Drawing Sheets

(56) References Cited

U.S. PATENT DOCUMENTS

| | | |
|---|---|---|
| 2012/0324236 A1 | 12/2012 | Srivastava |
| 2013/0097706 A1 | 4/2013 | Titonis |
| 2014/0013434 A1 | 1/2014 | Ranum |
| 2014/0053267 A1 | 2/2014 | Klein |
| 2014/0181975 A1 | 6/2014 | Spernow |
| 2014/0189687 A1* | 7/2014 | Jung ................. G06F 21/14 718/1 |
| 2014/0237596 A1 | 8/2014 | Grytsan |
| 2015/0154398 A1 | 6/2015 | Jones |
| 2015/0242626 A1 | 8/2015 | Wang |
| 2016/0191550 A1 | 6/2016 | Ismael |
| 2017/0083703 A1* | 3/2017 | Abbasi ............... G06F 21/561 |
| 2017/0103202 A1 | 4/2017 | Kim |
| 2017/0243000 A1 | 8/2017 | Shraim |
| 2017/0289109 A1 | 10/2017 | Caragea |
| 2018/0025157 A1* | 1/2018 | Titonis ............ H04W 12/1208 726/24 |
| 2018/0181752 A1 | 6/2018 | Guri |
| 2018/0183814 A1 | 6/2018 | Sambandam |
| 2018/0218153 A1 | 8/2018 | Edwards |
| 2019/0007436 A1 | 1/2019 | Dods |
| 2019/0081963 A1 | 3/2019 | Waghorn |

* cited by examiner

EFFICIENT PROGRAM DEOBFUSCATION THROUGH SYSTEM API INSTRUMENTATION

CROSS REFERENCE TO OTHER APPLICATIONS

This application is a continuation of co-pending U.S. patent application Ser. No. 15/701,331 entitled EFFICIENT PROGRAM DEOBFUSCATION THROUGH SYSTEM API INSTRUMENTATION filed Sep. 11, 2017 which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware attempt to pack or otherwise obfuscate the malicious code to evade detection by firewalls, host security software, and/or virtualized malware analysis. Further, malware authors are using increasingly sophisticated techniques to pack/obfuscate the workings of their malicious software.

BRIEF DESCRIPTION OF THE DRAWINGS

Various embodiments of the invention are disclosed in the following detailed description and the accompanying drawings.

FIGS. 4A-C illustrate an embodiment of a graphical user interface (GUI) that includes visualizations for efficient program deobfuscation through system API instrumentation during monitoring of a malware sample.

DETAILED DESCRIPTION

Figure 1:
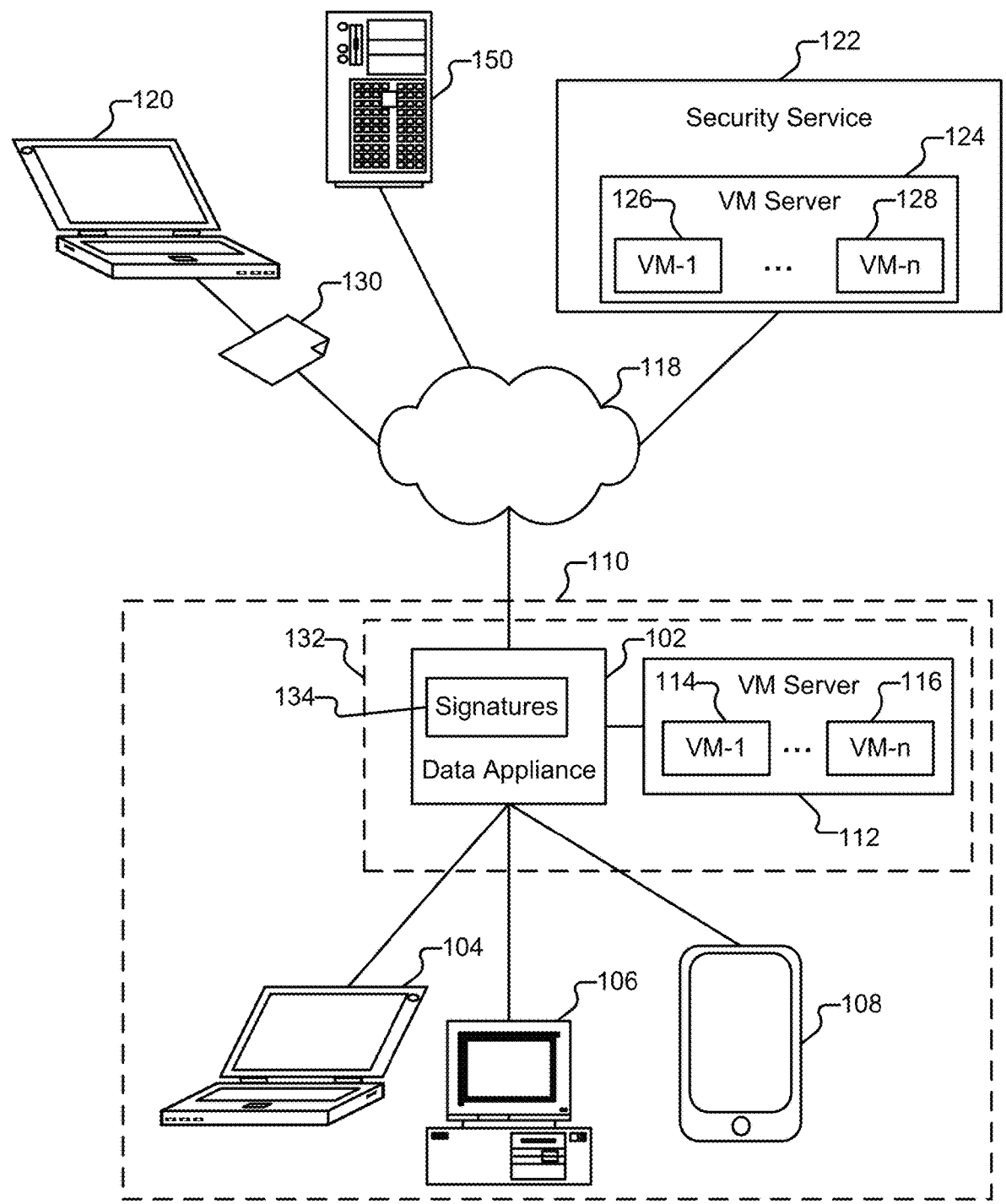
FIG. 1 illustrates an example of an environment in which malware is detected and its harm reduced in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some types of malware attempt to pack or otherwise obfuscate the malicious code to evade detection by firewalls, host security software (e.g., host security software/agents), and/or virtualized malware analysis. Unfortunately, malware authors are using increasingly sophisticated techniques to pack/obfuscate the workings of their malicious software. As such, there exists an ongoing need for improved techniques to detect malware and prevent its harm.

The deobfuscated or unpacked binaries (e.g., binary code, also referred to herein as code) typically include the malicious payload that is executed at runtime, which is concealed/kept hidden and only decoded/decompressed and/or decrypted at runtime (e.g., in memory) when needed in an attempt to avoid malware detection with existing malware detection techniques. This obfuscation/packing approach has become common practice for malware authors because such can evade detection of their malicious payloads and/or make such detection significantly more difficult (e.g., if the deobfuscated/unpacked malicious payload is not stored on disk (to evade host security detection) and is not transferred across networks (to evade network security/firewall detection)). As such, new techniques are needed to facilitate efficient and effective detection of obfuscated/packed malware binary code.

Overview of Techniques for Efficient Program Deobfuscation Through System API Instrumentation Techniques for efficient program deobfuscation through system application program interface (API) instrumentation are disclosed. For example, techniques for efficient program deobfuscation through system API instrumentation can be applied to address the computer security technological challenges and problems that are associated with malware analysis of binaries that are obfuscated or packed (e.g., obfuscated or packed binaries can be encoded/obfuscated, encrypted, compressed, and/or other combinations and approaches can be used by malware authors for obfuscating/packing malware binary code). In some embodiments, efficient program deobfuscation through system API instrumentation includes an unpacking and snapshotting mechanism based on system call/API events (e.g., to efficiently and effectively detect when the malware sample is executing instructions that did not exist in memory when the process was started, which can be utilized as a trigger for performing another snapshot of pages in memory associated with the process) as further described below.

For example, a malware analysis system can implement the disclosed techniques for efficient program deobfuscation through system API instrumentation. At a first step of the malware analysis (e.g., using the malware analysis system), generating an image of all memory in the virtual address space of the analyzed process on execution of the first instruction of a malware sample is performed. Various techniques can be performed to capture all process memory, such as by walking the page table, comparing each page in the page table to see if any changes are detected in the page contents, and if so generating a snapshot of the page (e.g., creating an image/dump that can be stored in a page cache to only image/dump pages that have changed, which in the Microsoft Windows® operating system (OS) platform can be performed using a virtual query to enumerate the relevant pages in memory). Also, in some cases, OS libraries can be filtered out to avoid caching pages associated with such OS libraries (e.g., as such are generally not associated with malware binaries). As further described below, comparing all subsequent return addresses against a previous snapshot is performed to determine whether to perform another snapshot (e.g., image/dump) of the relevant pages in memory based on system API calls (e.g., selected system API calls that are monitored (e.g., intercepted/hooked) as further described below).

At a second step of the malware analysis, instrumenting or "hooking" a subset of all functions exposed by the system API in the process memory is performed. This can optionally also be implemented via instrumenting processor architecture specific events that indicate a transition to the OS kernel is happening. For example, on an Intel x86 device running the Microsoft Windows® OS platform, the "SYSENTER" or "SYSCALL" events from the monitored process would indicate kernel transitions.

At a third step of the malware analysis, during a monitored emulation of the malware sample (e.g., execution of the malware sample in an instrumented virtualized execution environment, which can be allowed to execute in the instrumented virtualized execution environment for one, five, ten minutes, or some other period of time or until deobfuscated malware is detected), each time one of these functions/selected system APIs is called, the call stack is inspected to determine whether any return address in the call stack points to a memory address that has changed since the first image of memory is performed. For example, this can be implemented by walking the stack to check all return addresses if code existed in a previous snapshot of memory, if no return addresses point to changes in code, then the malware analysis processing can continue (iteratively) malware sample execution without taking another snapshot of one or more memory pages. However, if a return address points to changes in code, then another snapshot of the relevant page(s) in memory can be performed as described below (e.g., at step 4).

At a fourth step of the malware analysis, if memory at any of the return address locations differs from the memory in the initial memory image, then the malware is executing potentially unpacked code and the memory is reimaged and the unpacked code can be parsed from the dumped memory. As such, the disclosed techniques efficiently only perform snapshots of memory after a selected system event/API call is detected and walking the stack reveals one or more return addresses indicating changes to the code in the memory (e.g., as such is an indicator of potential unpacking behavior detected by the malware analysis system during the monitored execution of the malware sample).

At a fifth step of the malware analysis, this process is performed iteratively in that once a snapshot of the unpacked code is taken, the processing continues (e.g., iteratively) to monitor for additional layers of unpacking. After each time that unpacked code is detected as described above and a snapshot is taken, comparing all subsequent return addresses against the previous snapshot is performed. It should be noted that it is relatively common for malware to have multiple payloads that can be deobfuscated in memory.

At a sixth step of the malware analysis, a deobfuscation analysis engine reassembles memory pages and analyzes the reassembled memory pages to identify an executable associated with the unpacked malware binary (e.g., the reassembled memory pages can be scanned for an executable in memory using one or more of various existing tools that can detect executables based on known byte/signature patterns for executables, such as for WinPE executables and/or other executable file formats, such as using a commercially available tool/debugger, such as the PE Files, Volatility tool, and/or OllyyDumpEx plugin). In some cases, the deobfuscation analysis engine automatically generates a malware signature based on a static analysis of the identified executable associated with the unpacked malware binary (e.g., using pattern matching techniques, such as provided by the YARA tool or other commercially available tools/open source solutions).

The automatically generated signatures can be distributed to network security devices (e.g., firewalls), host-based security solutions (e.g., host-based security software/agents), and/or security services to facilitate identification of such malware using these signatures.

Also, the disclosed techniques can be used to automatically identify malicious payloads, such as flagging malware families via static and behavior detection rules (e.g., for packed malware samples, these matching rules can be applied directly on the deobfuscated payloads).

In some cases, deobfuscated payloads can be resubmitted for static and dynamic analysis of executables from these changed pages in memory. This may allow for identification of the malware based on dynamic/behavior signatures using the dynamic engine such as further described below.

Further, the disclosed techniques can be used to automatically generate additional indicators for deobfuscated payloads that have not been easily accessible before. This additional data from processing automatically deobfuscated payloads could be accessible to security/malware analysts as well as customers (e.g., via the AutoFocus™ contextual threat intelligence service provided by Palo Alto Networks® which can be used to accelerate analysis, correlation, and prevention workflows, which can facilitate security detection/response to, for example, unique, targeted attacks which are automatically prioritized with full context, allowing security teams to respond to critical attacks faster, without additional IT security resources).

Accordingly, various techniques for efficient program deobfuscation through system API instrumentation are disclosed. As will be apparent to one skilled in the art in view of the various techniques and embodiments described herein, the various techniques described herein for providing efficient program deobfuscation through system API instrumentation can be performed using cloud-based security solutions, network device-based security solutions, host-based/agent-based security solutions, virtualized/software-defined networking (SDN)-based security solutions, and/or various combinations thereof, such as further described below with respect to various embodiments.

System Environment for Efficient Program Deobfuscation Through System API Instrumentation FIG. 1 illustrates an example of an environment in which malware is detected and its harm reduced in accordance with some embodiments. In the example shown in FIG. 1, a malicious individual (using system 120) has created malware 130. The malicious individual hopes that a client device, such as client device 104, will execute a copy of malware 130, compromising the client device, and causing the client device to then be used for potentially nefarious purposes. For example, the compromised client device can then be instructed to perform tasks (e.g., cryptocurrency mining, participating in denial of service attacks, and/or utilized for lateral movement/advanced persistent threats) and to report information to an external entity, such as command and control (C&C) server 150, as well as to receive instructions from C&C server 150, as applicable.

Returning to the example shown in FIG. 1, suppose client devices 104-108 are a laptop computer, a desktop computer, and a tablet (respectively) present in an enterprise network 110 (belonging to the "Acme Company"). Data appliance 102 is configured to enforce policies regarding communications between clients, such as clients 104 and 106, and nodes outside of enterprise network 110 (e.g., reachable via external network 118, such as the Internet). Examples of such policies include ones governing traffic shaping, quality of service, and routing of traffic. Other examples of policies include security policies such as ones requiring the scanning for threats in incoming (and/or outgoing) email attachments, web site downloads, files exchanged through instant messaging programs, and/or other file transfers. In some embodiments, appliance 102 is also configured to enforce policies with respect to traffic that stays within enterprise network 110.

Appliance 102 can take a variety of forms. For example, appliance 102 can comprise a dedicated device or set of devices. The functionality provided by appliance 102 can also be integrated into or executed as software on a general purpose computer, a computer server, a gateway, and/or a network/routing device. In some embodiments, services provided by data appliance 102 are instead (or in addition) provided to client 104 by software (e.g., host security software or an agent) executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be included in embodiments of system 102 as applicable.

As will be described in more detail below, appliance 102 can be configured to work in cooperation with one or more virtual machine servers (112, 124) to perform malware analysis/prevention. As one example, data appliance 102 can be configured to provide a copy of malware 130 to one or more of the virtual machine servers for real-time analysis, in which the malware is executed in an instrumented virtual environment (e.g., where various user level hooks and/or kernel level hooks in an execution environment emulated in a virtual environment facilitate the monitoring of various program behaviors during execution in the virtual environment, such as performing efficient program deobfuscation through system API instrumentation as described herein). As another example, security service 122 (e.g., a cloud-based security service) can provide a list of signatures of known-malicious files (e.g., pattern-based signatures, behavior signatures, and/or other malware signatures) to appliance 102 as part of a subscription, which can be stored in a data plane of data appliance 102 as shown at 134. Those signatures can be generated by security service 122 in conjunction with the techniques for efficient program deobfuscation through system API instrumentation as described herein. As yet another example, and as will be described in more detail below, results of analysis performed by the virtual machine servers (e.g., VM server 112 executing VM instances 114 and 116 and/or VM server 124 executing VM instances 126 and 128) can be used to generate those signatures in conjunction with the techniques for efficient program deobfuscation through system API instrumentation as described herein.

An example of a virtual machine server is a physical machine comprising commercially available server-class hardware (e.g., a multi-core processor, 64+ Gigabytes of RAM, and one or more Gigabit network interface adapters) that runs commercially available virtualization software, such as VMware ESXi, Citrix XenServer, Kernel Based Virtual Machine (KVM), or Microsoft Hyper-V. The virtual machine server can be configured to run a commercially available hypervisor (without customizations) or a customized hypervisor (whether as a modified version of a commercially-available hypervisor, or a custom-built hypervisor).

Returning to the example of FIG. 1, the virtual machine servers can be separate from, but in communication with, data appliance 102, as shown. A virtual machine server can also perform some or all of the functions of data appliance 102 (or the subset of functions described herein as pertaining to the performing of efficient program deobfuscation through system API instrumentation), and a separate data appliance 102 omitted as applicable. Further, a virtual machine server can be under the control of the same entity that administers data appliance 102 (e.g., virtual machine server 112); the virtual machine server can also be provided by a third party (e.g., virtual machine server 124, which can be configured to provide services to appliance 102 via third party service 122). In some embodiments, data appliance 102 is configured to use one or the other of virtual machine servers 112 and 124 for malware analysis. In other embodiments, data appliance 102 is configured to use the services of both servers (and/or additional servers not pictured). Further, in various embodiments, multiple virtual machine servers are present within the same platform. For example, security service 122 (e.g., a commercially available security service, such as the WildFire™ cloud-based malware analysis environment provided by Palo Alto Networks®) can make use of multiple virtual machine servers (in addition to virtual machine server 124). In yet additional embodiments, at least some virtual machine servers are provided by an entity that is different from the operator of security service 122. For example, security service 122 could be operated by a computer security company which makes use of third party cloud computing services, such as Amazon Web Services (AWS), to provide at least some of the computer security company's virtual machine servers. Finally, while examples are described herein as making use of virtual machine servers (e.g., to allow for a single host system executing multiple guest systems at once), the techniques described herein, and in particular, the activities described as being performed inside a guest system, can also be performed using non-virtualized hardware (e.g., to thwart anti-virtual-machine techniques employed by malware).

Figure 2:
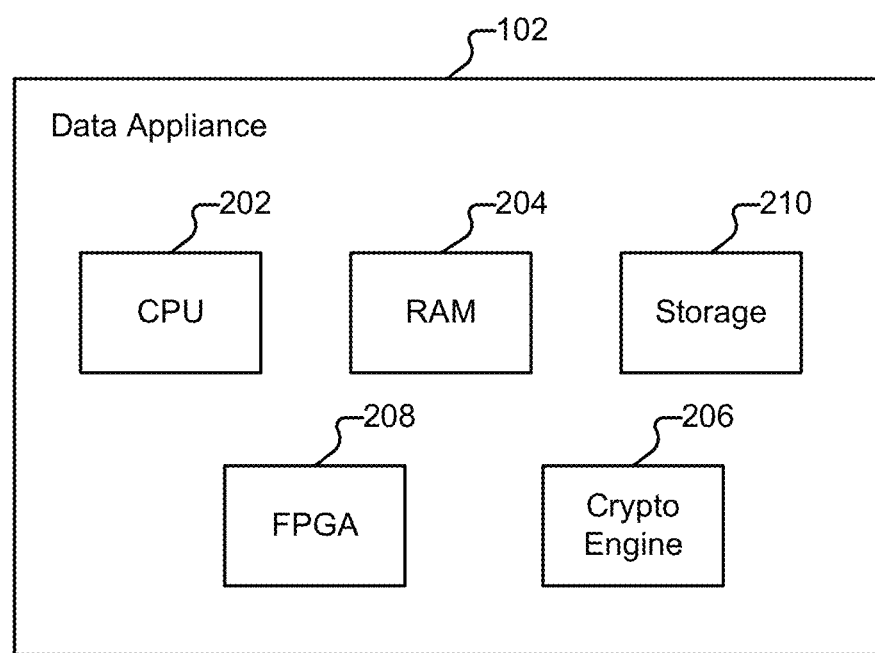
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as signatures (e.g., pattern-based signatures, behavior signatures, and/or other malware signatures, which can be generated using the techniques for efficient program deobfuscation through system API instrumentation as described herein). Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Using Virtual Machines to Analyze Files

A virtual machine (VM) can be used to perform behavior profiling (e.g., in a VM sandbox environment) using various heuristic-based analysis techniques that can be performed in real-time during a file transfer (e.g., during an active file/attachment download) and/or on files previously collected (e.g., a collection of files submitted for batch analysis). Documents, executables, and other forms of potentially malicious software (e.g., to be evaluated) are referred to herein as "malware samples" or simply as "samples."

Returning to the example of FIG. 1, suppose a malicious user of system 120 sends an email message to a user of client 104 that includes a malicious attachment. The attachment may be an executable (e.g., having a .exe extension) and may also be a document (e.g., a .doc or .pdf file). The message is received by data appliance 102, which determines whether a signature for the attachment is present on data appliance 102. A signature, if present, can indicate that the attachment is known to be safe, and can also indicate that the attachment is known to be malicious, in accordance with various embodiments. If no signature for the attachment is found, data appliance 102 is configured to provide the attachment to a virtual machine server, such as virtual machine server 112 or 124, for analysis.

Virtual machine server 112 is configured to perform static analysis of samples, and also to perform dynamic analysis of samples, in which the samples are executed (or opened in an application, as applicable) in one or more virtual machine instances 114-116. The virtual machine instances may all execute the same operating system (e.g., Microsoft Windows® XP SP 3, Microsoft Windows® Windows 7, and Microsoft Windows® Windows 10), may execute different operating systems (e.g., Apple Mac® OS or iOS platforms, Google Android® OS platforms, or Linux OS platforms), and/or may collectively execute combinations of operating systems (and/or versions thereof) (e.g., with VM instance 116 emulating an Android operating system). In some embodiments, the VM image(s) chosen to analyze the attachment are selected to match the operating system of the intended recipient of the attachment being analyzed (e.g., where the operating system of client 104 is Microsoft Windows XP SP 2). Observed behaviors resulting from executing/opening the attachment (such as changes to certain platform, software, registry settings, any network connection attempts made, or memory in which changes to memory can be monitored for implementing efficient program deobfuscation through system API instrumentation) are logged and analyzed for indications that the attachment is malicious.

In some embodiments, the dynamic analysis is performed in several stages as similarly described above and further described below. Specifically, the dynamic analysis can be performed in several stages to monitor changes to memory for implementing efficient program deobfuscation through system API instrumentation as described above and further described below.

In some embodiments log analysis (e.g., of results of static/dynamic analysis) is performed by the VM server (e.g., VM server 112). In other embodiments, the analysis is performed at least in part by appliance 102. The malware analysis and enforcement functionality illustrated in FIG. 1 as being provided by data appliance 102 and VM server 112 is also referred to herein as being provided by malware analysis system 132. As explained above, portions of malware analysis system 132 may be provided by multiple distinct devices, but may also be provided on a single platform, as applicable. For example, the functionality described herein (or portions thereof) as being provided by malware analysis system 132 can also be provided by security service 122 using VM server 124.

If the attachment is determined to be malicious, appliance 102 can automatically block the file download based on the analysis result. Further, a signature can be generated and distributed (e.g., to other data appliances, host security software/agents, and/or to cloud security service 122) to automatically block future file transfer requests to download the file determined to be malicious.

Figure 3:
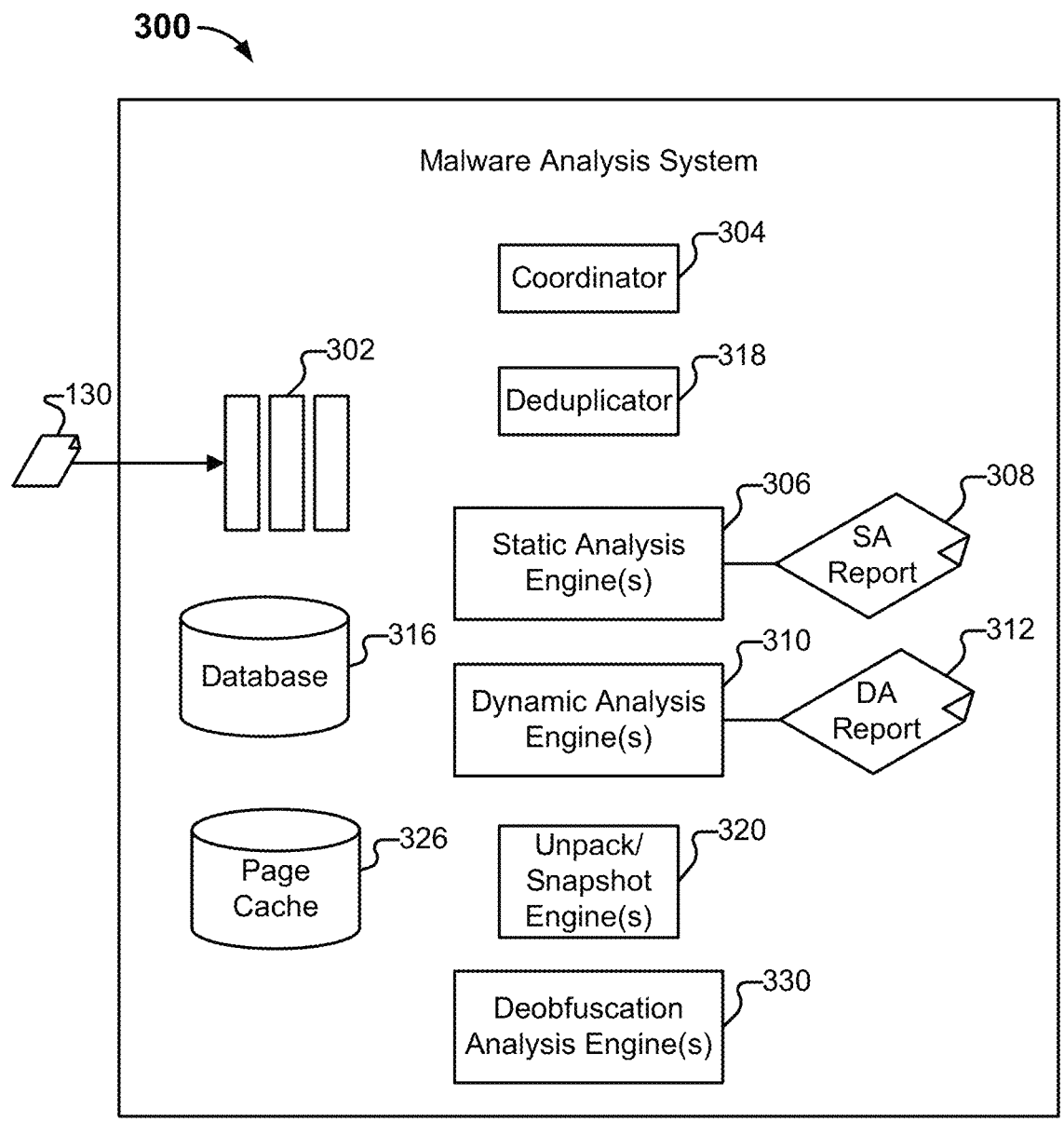
FIG. 3 illustrates an example of logical components that can be included in a malware analysis system for analyzing candidate malware by performing efficient program deobfuscation through system API instrumentation in accordance with some embodiments.

Logical Components for Performing Efficient Program Deobfuscation Through System API Instrumentation FIG. 3 illustrates an example of logical components that can be included in a malware analysis system for analyzing candidate malware by performing efficient program deobfuscation through system API instrumentation in accordance with some embodiments. System 300 can be implemented using a single physical device. System 300 can also be implemented, collectively, across multiple distinct devices. For example, when data appliance 102 works in combination with virtual machine server 112, malware analysis system 132 is an embodiment of system 300. As another example, the functionality of system 300 can be provided by security service 122. As explained above, cloud security service 122 can include a single (124), or multiple virtual machine servers.

As mentioned above, a given piece of candidate malware (e.g., a potentially malicious document/file/etc.) can be received for analysis in a variety of ways. In the following discussion, malware 130 (intended for a client such as client 104 by a malware author) is received by data appliance/platform 102 and a check is made (e.g., against information stored in storage 210) to determine whether malware 130 matches any signatures of known malware. Suppose in the following example that no such signature is present on platform 102, and also that no such signature is present on cloud security service 122 (where platform 102 is configured to check for the existence of a signature on security service 122). Platform 102 sends a copy of malware 130 to security service 122 for further analysis (e.g., before allowing it to be delivered to client device 104). In various embodiments, when a new piece of candidate malware is received for analysis (e.g., an existing signature associated with the file is not present at security service 122), it is added to a processing queue 302.

Coordinator 304 monitors queue 302, and as resources (e.g., a static analysis worker) become available, coordinator 304 fetches a piece of potential malware for analysis from queue 302 for processing (e.g., fetches a copy of malware 130). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306). In yet other embodiments, static analysis is omitted, or provided by a third party, as applicable.

The static analysis engine obtains general information about the candidate malware and includes it (along with heuristic and other information, as applicable) in a static analysis (SA) report 308. The report can be created by the static analysis engine, or by coordinator 304 (or by another appropriate component) which can be configured to receive the information from static analysis engine 306. In some embodiments, the collected information is stored in one or more database records for the candidate malware (e.g., in a database 316), instead of or in addition to a separate static analysis report 308 being created (i.e., portions of the database record form the static analysis report 308).

Once the static analysis is complete, coordinator 304 locates an available dynamic analysis engine 310 to perform dynamic analysis on the candidate malware. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis engine manages a virtual machine instance. In some embodiments, results of static analysis (e.g., performed by static analysis engine 306), whether in report form (308) and/or as stored, such as in database 316, are provided as input to a dynamic analysis engine 310. For example, the static analysis report information can be used to help select/customize the virtual machine instance used by dynamic analysis engine 310 (e.g., Microsoft Windows XP Service Pack 3 vs. Windows 7 Service Pack 2). Where multiple virtual machine instances are executed at the same time, a single dynamic analysis engine can manage all of the instances, or multiple dynamic analysis engines can be used (e.g., with each managing its own virtual machine instance), as applicable. In some embodiments, the collected information is stored in one or more database records for the candidate malware (e.g., in database 316), instead of or in addition to a separate dynamic analysis (DA) report 312 being created (i.e., portions of the database record form the dynamic analysis report 312).

As also shown in FIG. 3, malware analysis system 300 includes an unpack/snapshot engine(s) 320, a page cache 326, and a deobfuscation analysis engine(s) 330 that perform various functions for implementing efficient program deobfuscation through system API instrumentation in accordance with some embodiments. For example, during a dynamic analysis phase, dynamic malware analysis engine (s) 310 can utilize unpack/snapshot engine 320 to automatically unpack and selectively snapshot process pages in memory during emulation of the malware sample as similarly described herein. The snapshotted memory pages can be stored in page cache 326. The output of the dynamic analysis including the efficient program deobfuscation through system API instrumentation can be provided as input to deobfuscation analysis engine(s) 330 for reassembling the cached memory pages, analyzing of the reassembled cached memory pages, and generating a signature based on a static analysis the reassembled cached memory pages (e.g., in an example implementation, the static analysis can be performed using static analysis engine(s) 306). The generated signature can be added to database 316.

In various embodiments, the initial static analysis of candidate malware is omitted or is performed by a separate entity, as applicable. As one example, traditional static and/or dynamic analysis may be performed on files by a first entity. Once it is determined (e.g., by the first entity) that a given file is malicious, and more particularly, that the file is (or is potentially) making use of obfuscation or packing to attempt to conceal malware binaries, then the file can be provided to a second entity (e.g., the operator of security service 122) specifically for additional analysis with respect to the obfuscation or packing to attempt to conceal malware binaries (e.g., by a dynamic analysis engine 310 in coordination with unpack/snapshot engine 320, page cache 326, and deobfuscation analysis engine 330).

Interfaces for Efficient Program Deobfuscation Through System API Instrumentation In one embodiment, a tool that implements the disclosed techniques for efficient program deobfuscation through system API instrumentation includes an interface. For example, the interface can provide graphical visualizations to illustrate the changes in memory identified during execution of a malware sample in a virtualized malware analysis environment, such as further described below.

Figure 4A:
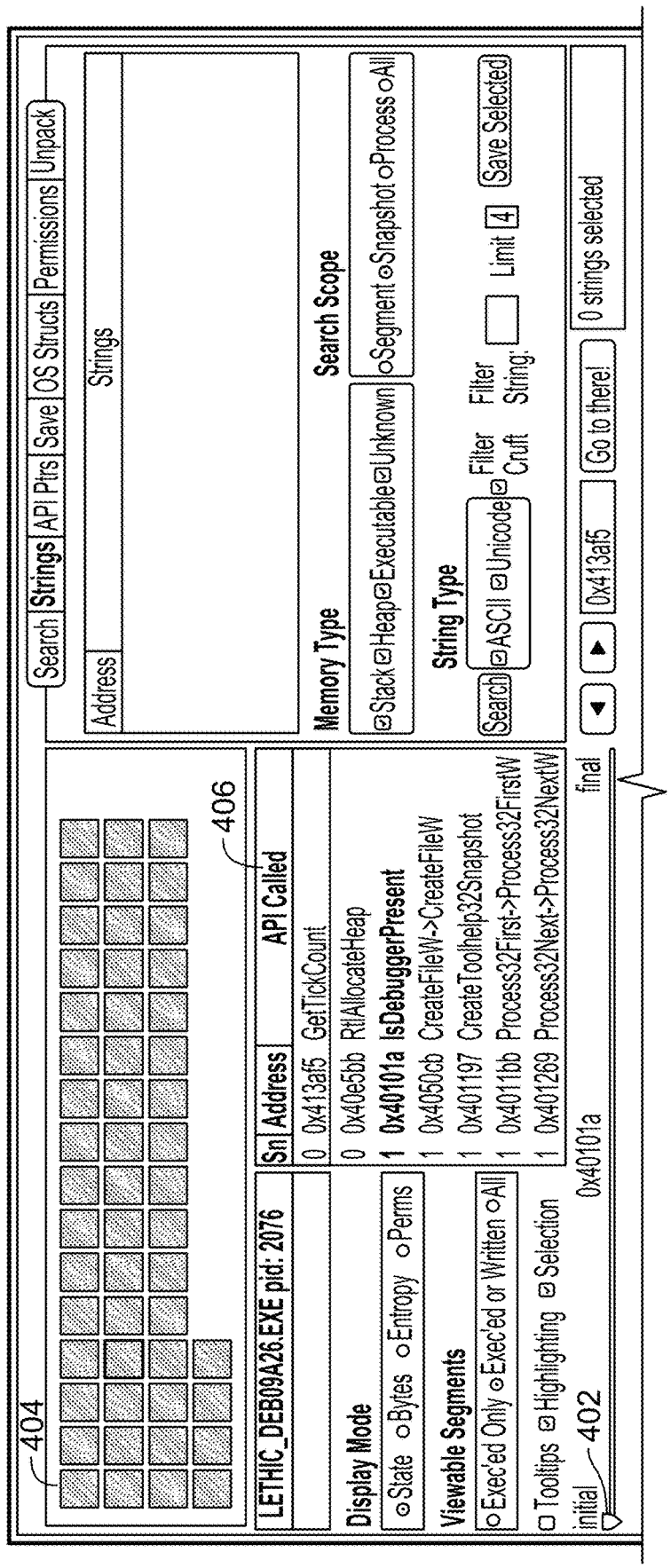
Figure 4B:
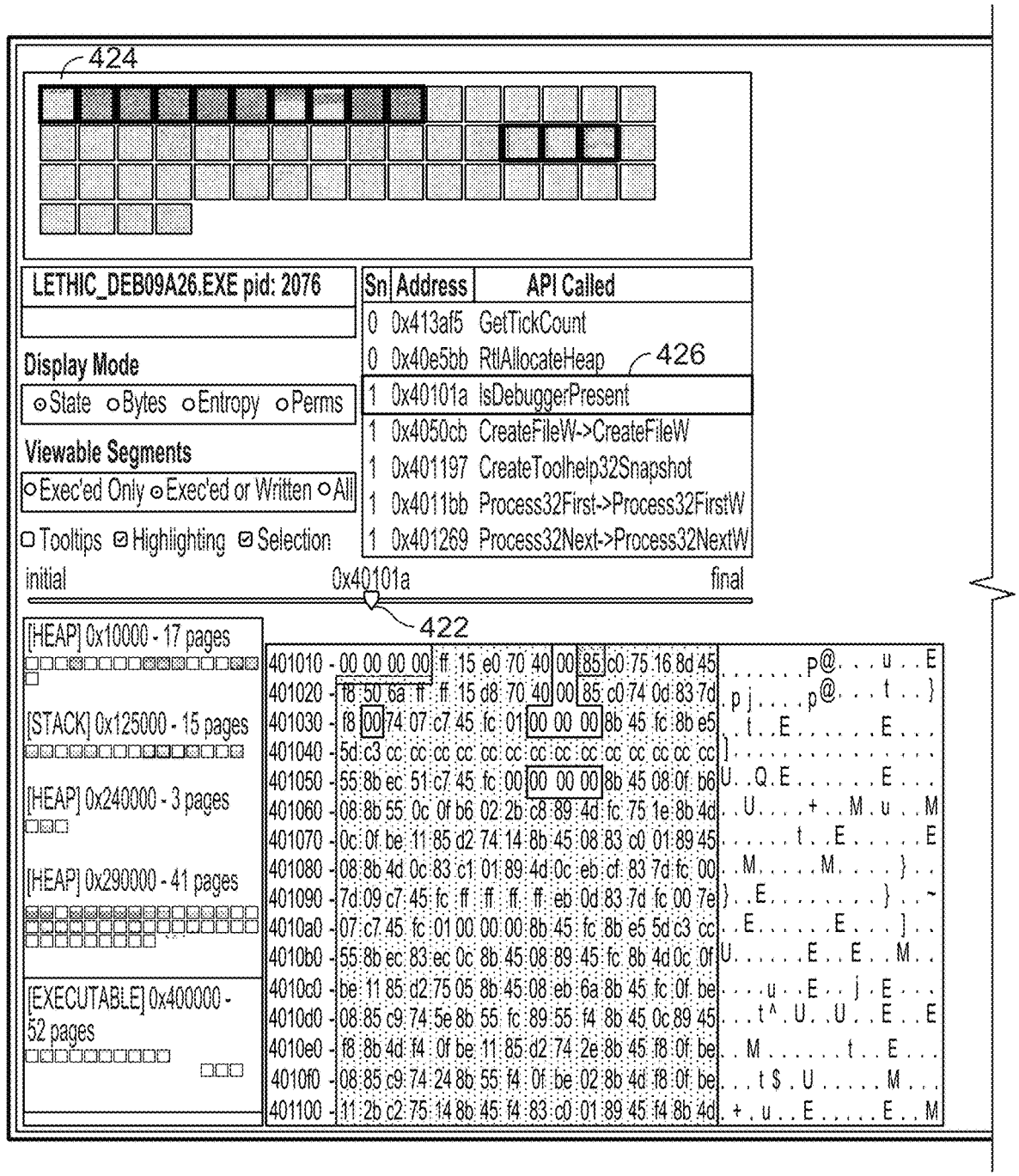
Figure 4B:
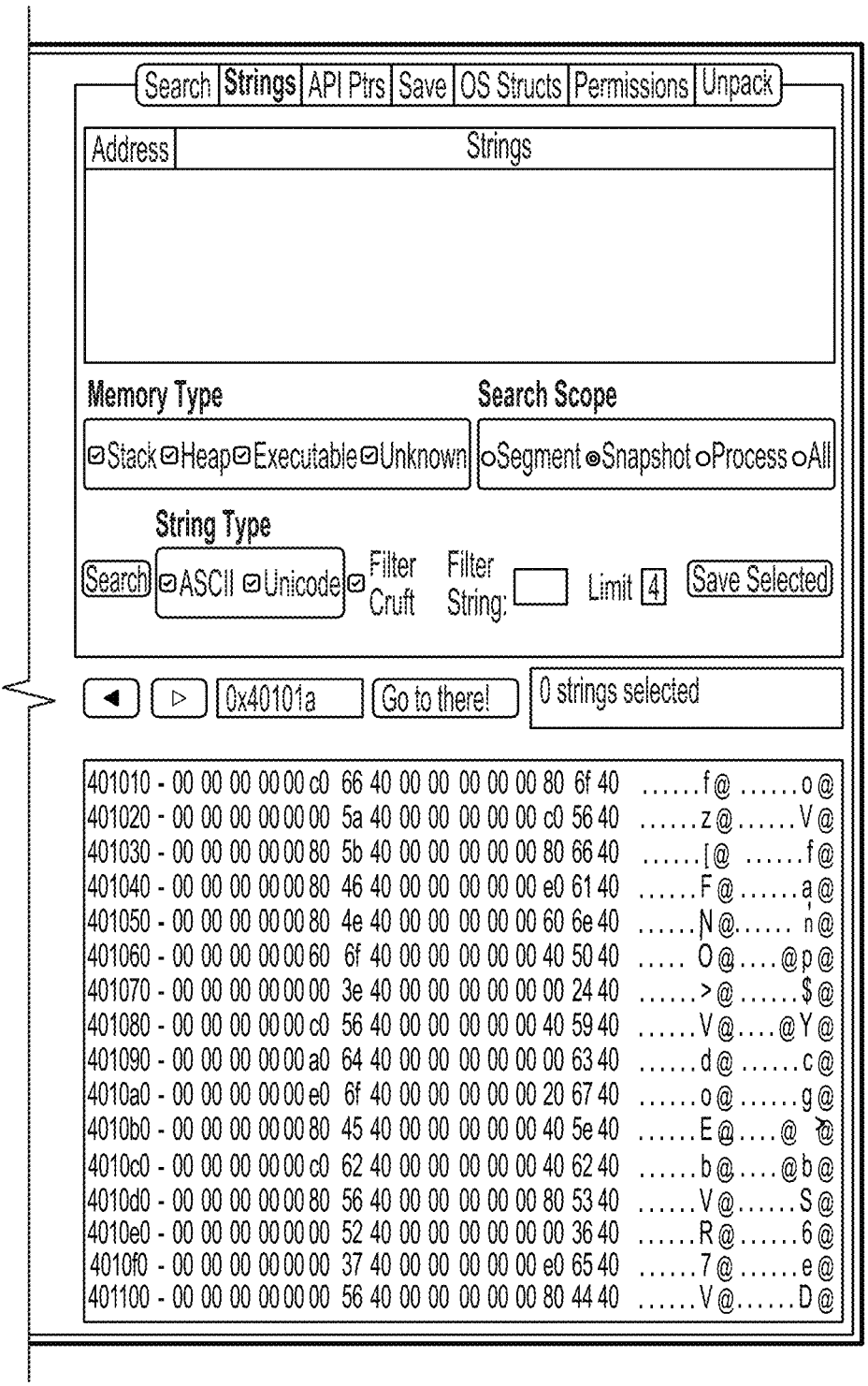
Figure 4C:
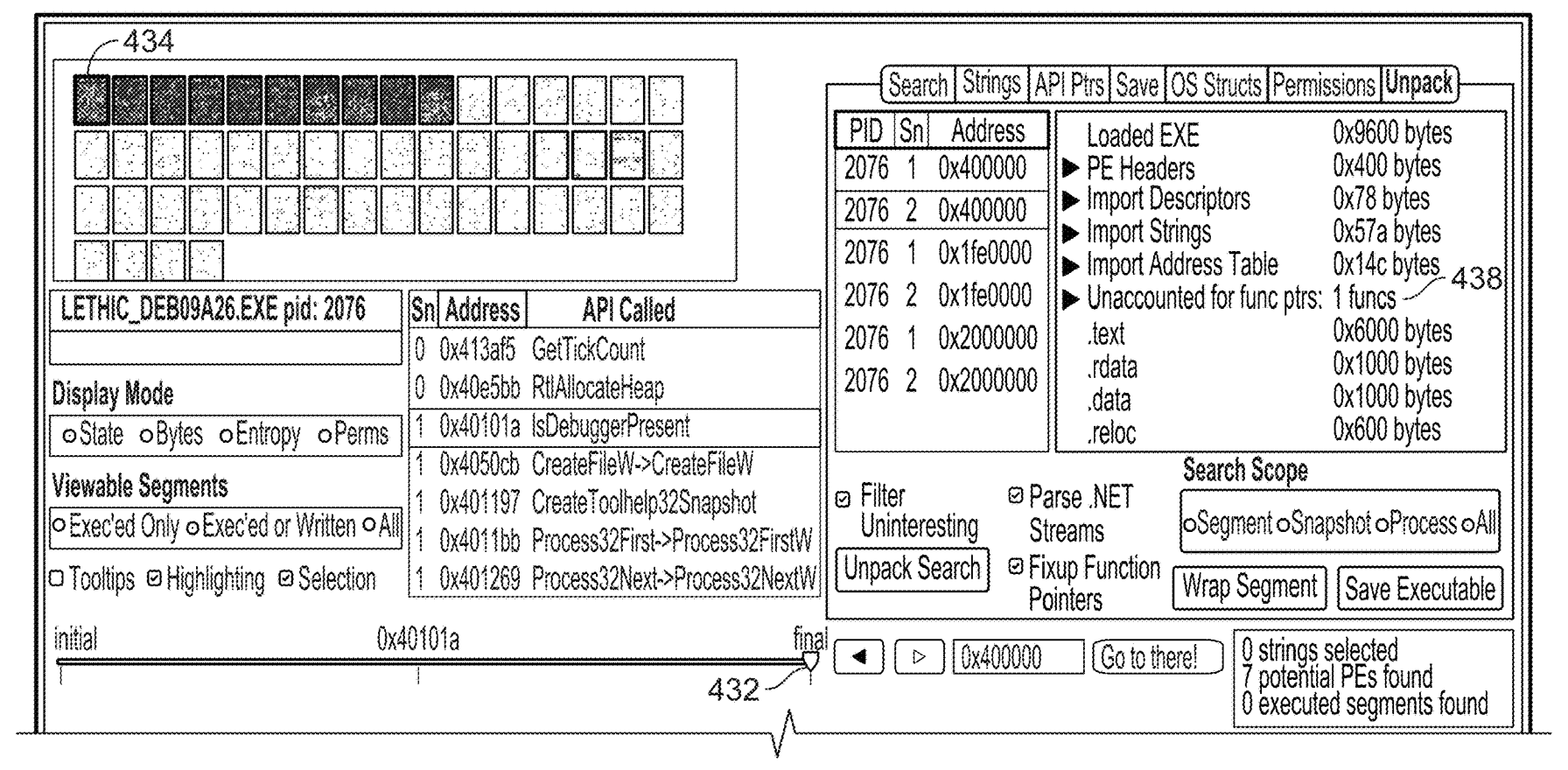
Figure 4C:
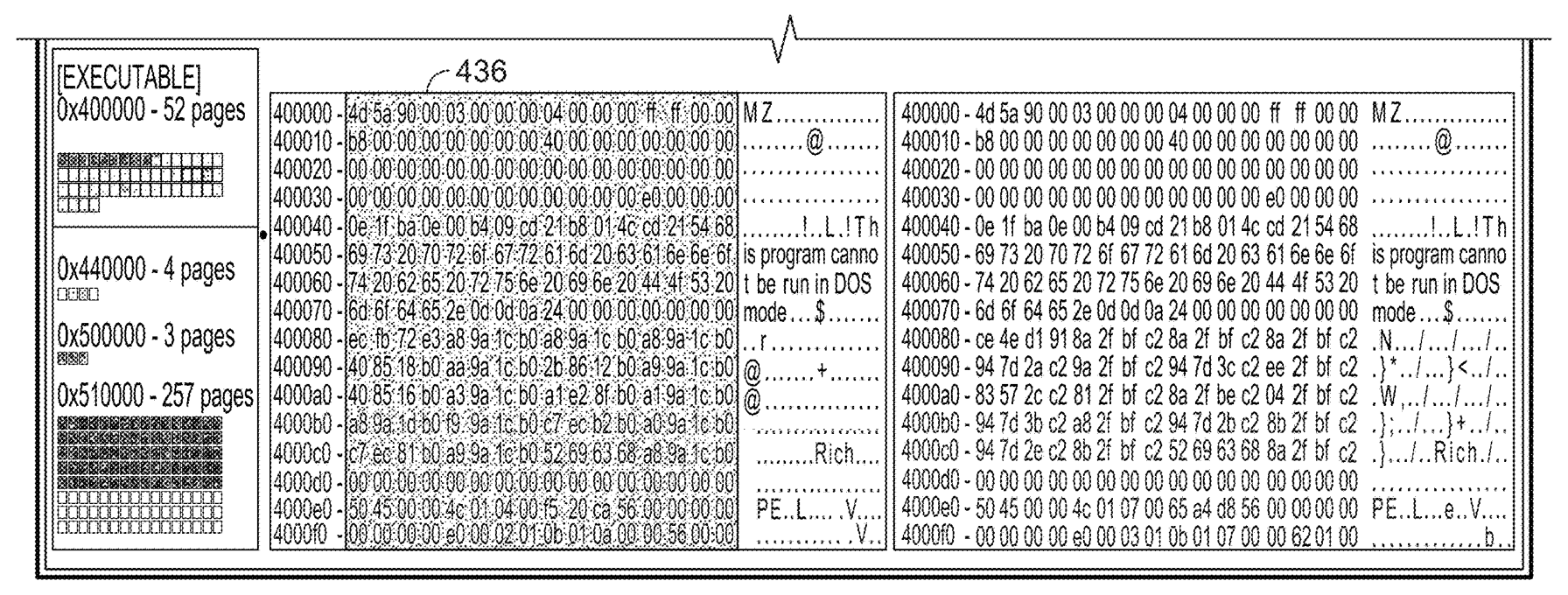

FIGS. 4A-C illustrate an embodiment of a graphical user interface (GUI) that includes visualizations for efficient program deobfuscation through system API instrumentation during monitoring of a malware sample. In various embodiments, these GUI visualizations are generated and output by system 300 (examples of which include malware analysis system 132 and cloud security service 122 as shown in FIG. 1).

Referring to FIG. 4A, a GUI visualization of a malware sample analysis at time $t_0$ shows what is in memory, which generally should be the same as what is stored on disk (e.g., prior to any execution that can allow for deobfuscation or unpacking of malware binary code that may be in the malware sample). As shown at 402, the malware analysis process begins at initial time $t_0$ (e.g., when candidate malware is received and emulated execution of the malware sample begins (before execution of a first instruction of the malware sample) using a dynamic analysis engine (310) and/or other components (320, 326, and 330) as shown in FIG. 3). In this example GUI visualization, pages in memory are shown at 404. The pages associated with the process are snapshotted and each page is stored in a distinct file, which can be cached using a table for identifying the pages in memory and associated snapshots of each of those pages (e.g., which can be stored in a page cache (326)). This initial snapshot of all of the pages in memory associated with the process at initial time $t_0$ are created and cached to provide a baseline for the contents in memory for the loaded and executed sample (e.g., for comparison during later points in time of execution of the sample to identify a subset (if any) of the pages in memory that are modified after initial time $t_0$ and after intercepted/hooked system call/API events based on a comparison with the contents of the respective pages in the initial or previous snapshot as further described below). Also, the events (e.g., system API calls) that are monitored are shown at 406 (e.g., in some cases, selected events can trigger new snapshots of memory during a monitoring of the malware sample execution as described below).

Referring to FIG. 4B, a GUI visualization of a malware sample analysis at time $t_1$ shows that a loaded executable overwrites what was loaded from disk. Specifically, at a subsequent point in execution time $t_1$ (0x40101a) as shown at 422, which is after a Windows system call/API IsDebuggerPresent is called as shown at 426, the sample performed unpacking of executable code in memory as shown at 424. As shown in the graphical visualization by the highlighted perimeters of the rectangles for a subset of the monitored pages in memory, using the disclosed techniques described above and below (e.g., detecting unaccounted for function pointers), the malware analysis system determined to perform another snapshot of memory, and the malware analysis system detected changes in content of each of these pages in memory since the initial time $t_0$ based on a comparison with the contents of the respective pages in the initial or previous snapshot. These detected changes in content of each of these pages in memory since the initial time $t_0$ indicate a potential unpacking behavior associated with the sample during emulated execution. Generally, such unpacking (e.g., decompressing/decrypting and loading) of executable code in memory (as opposed to a disk executable, that would simply load the same executable stored on disk into memory) is suspicious/potentially malware behavior.

While packing/obfuscation approaches are often associated with the distribution of malware binaries, it should be noted that there are legitimate commercial software vendors that utilize various packing/obfuscation approaches to distribute their software binaries (e.g., Google and various other commercial software vendors may use packing/obfuscation approaches to distribute their software binaries to protect the intellectual property in their code and make it more difficult to reverse engineer their code). However, such legitimate commercial software vendors typically sign their code, and signed code from a trusted vendor can generally be trusted as such vendors are not using packing/obfuscation approaches to distribute malware binaries.

Referring to FIG. 4C, a GUI visualization of a malware sample analysis at time $t_2$ shows that the overwritten memory pages with the unpacked executable code are highlighted. Specifically, this example GUI visualization illustrates a state of the malware sample analysis at a later point in execution time $t_2$ (final time during malware sample emulation) as shown at 432. In this example GUI visualization, the content of the selected page in memory shown at 434 is provided as shown at 436. Also, unaccounted for function pointers are shown at 438.

Various other interfaces can similarly provide graphical visualizations or other interfaces for the disclosed techniques for efficient program deobfuscation through system API instrumentation. The example GUI interface provides an intuitive GUI interface for a security analyst to efficiently identify the unpacked/deobfuscated malware code to focus their analysis and/or for generating a malware signature and/or performing other remedial actions as further described below.

System Call Checking

Figure 4D:
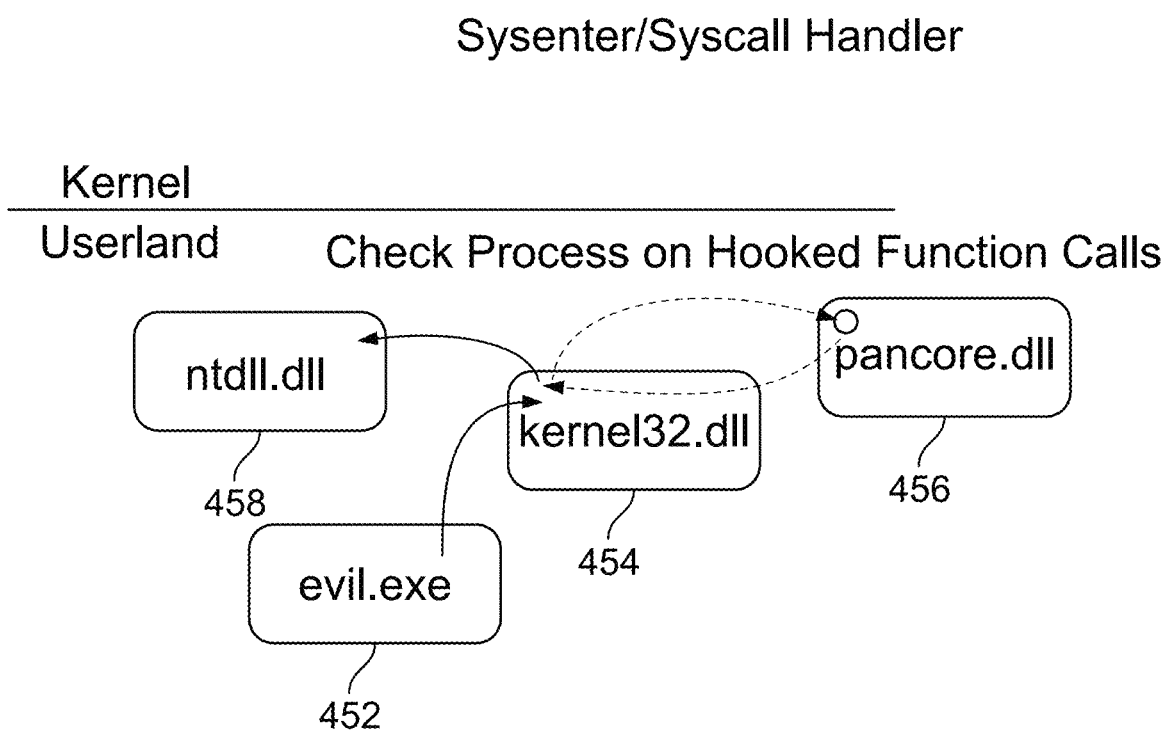
FIG. 4D is a functional diagram of system call checking performed for efficient program deobfuscation through system API instrumentation during monitoring of a malware sample.

FIG. 4D is a functional diagram of system call checking performed for efficient program deobfuscation through system API instrumentation during monitoring of a malware sample. In various embodiments, system call checking is performed by system 300 (examples of which include malware analysis system 132 and cloud security service 122 as shown in FIG. 1, and specifically, unpack/snapshot engine(s) 320 as shown in FIG. 3).

Referring to FIG. 4D, a malware sample, evil.exe, shown at 452, is monitored during sample emulation using the malware analysis system such as described above. As shown at 454, the evil.exe sample is monitored making a system call to kernel32.dll. This system API call is monitored (e.g., intercepted/hooked) by the API instrumentation of the malware analysis environment and a library in the instrumented computing environment (e.g., shown as pancore.dll in this example) is called as shown at 456, which then monitors the subsequent system API call ntdll.dll shown at 458. As described above, this can optionally also be implemented via instrumenting processor architecture specific events that indicate a transition to the OS kernel is happening. For example, on an Intel x86 device running the Microsoft Windows® OS platform, the "SYSENTER" or "SYSCALL" events from the monitored process would indicate kernel transitions as shown in FIG. 4D. As also described above, by checking the process on intercepted/hooked function calls, the malware analysis system can detect when the emulated sample executes system calls/APIs (e.g., or other calls/APIs of interest) and can then perform various other operations such as to monitor changes to pages in memory to perform the disclosed techniques for efficient program deobfuscation through system API instrumentation during monitoring of a malware sample.

As will be apparent, while the above-described embodiments are described with respect to monitored samples executing in Microsoft Windows® OS platform environments, the disclosed techniques can be similarly applied to various other OS platform environments, such as Apple Mac® OS, Linux, Google Android® OS, and/or other platforms, as would now be apparent to one of ordinary skill in the art in view of the disclosed embodiments.

Figure 5:
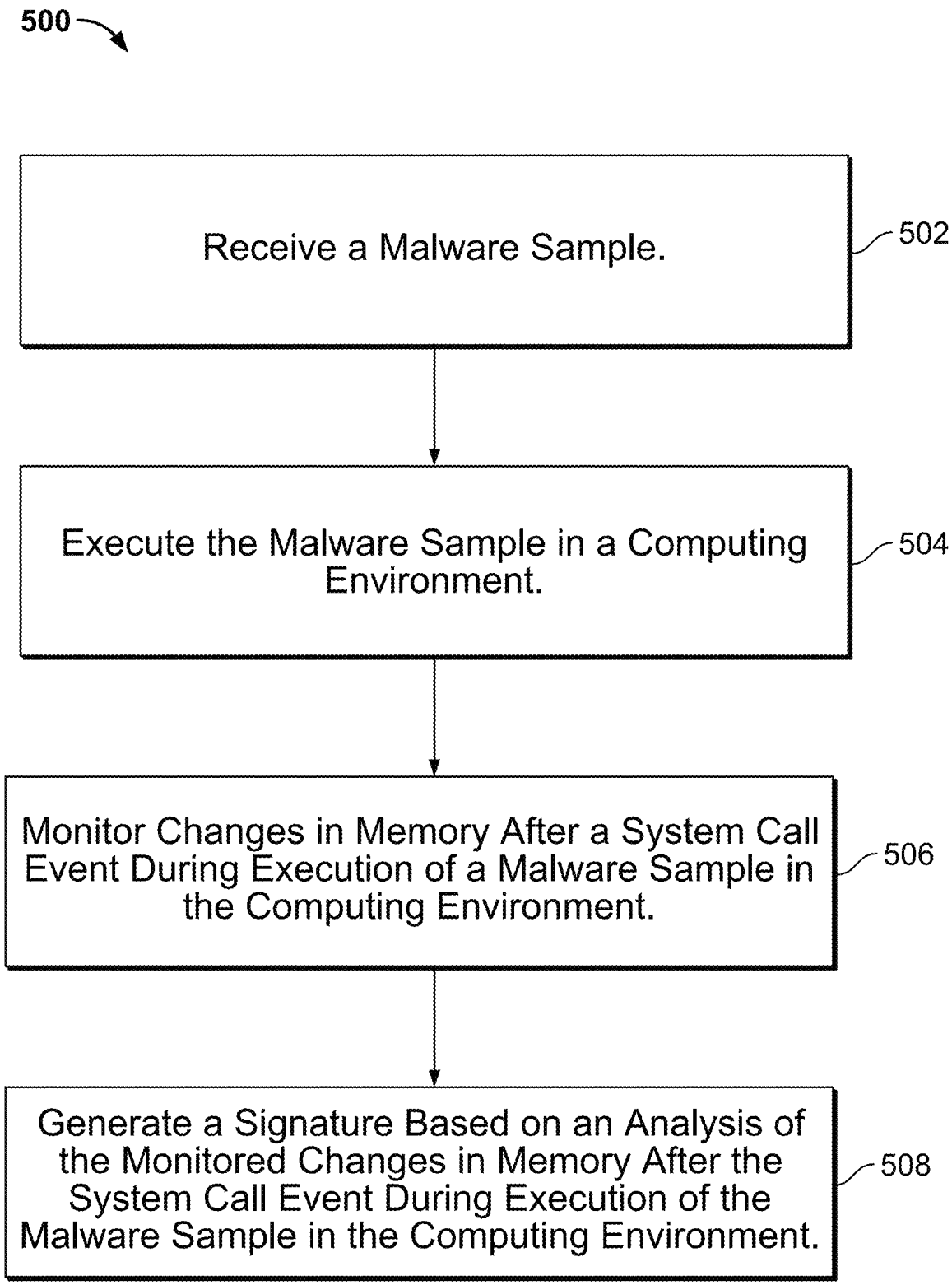
FIG. 5 illustrates an embodiment of a process for efficient program deobfuscation through system API instrumentation.

Processes for Performing Efficient Program Deobfuscation Through System API Instrumentation FIG. 5 illustrates an embodiment of a process for efficient program deobfuscation through system API instrumentation. In various embodiments, process 500 is performed by system 300 (examples of which include malware analysis system 132 and cloud security service 122 as shown in FIG. 1). The process begins at 502 when a malware sample (e.g., candidate malware) is received. As one example, candidate malware is received at 502 when an email (including an attachment) is received by data appliance 102 from system 120. As another example, data appliance 102 can be configured to transmit the attachment to service 122 for analysis. In that scenario, the candidate malware is received by service 122 at 502. As yet another example, candidate malware can be received at 502 as part of a batch operation (e.g., where cloud security service 122 receives a variety of malware samples over a period of time and a batch of received samples is provided to virtual machine server 124 for processing—with virtual machine server 124 receiving the batch at 502). Further, the batch operation can be repeated (e.g., on the same set of samples—or on a set that includes at least some of the same samples as previous batches).

At 504, the malware sample is executed in a computing environment. For example, the computing environment can be implemented initializing a virtual machine instance (e.g., an instrumented virtual environment, such as similarly described above with respect to 112 and 124 of FIG. 1). The virtual environment is instrumented, as applicable, such that behaviors observed while the application is executing are logged and/or monitored (e.g., intercepting/hooking system call/API events) as similarly described above.

At 506, monitoring changes in memory after a system call event during execution of a malware sample in the computing environment is performed. For example, each time one of these functions/selected system APIs is called, the call stack can be inspected to determine whether any return address in the call stack points to a memory address that has changed since the first/previous image of memory was performed, and if so, another snapshot can be performed which can be utilized to identify a subset of the pages in memory that have changed since the first/previous image of memory. As also discussed above, the disclosed techniques of snapshotting in memory based upon system call events can efficiently and effectively facilitate automatic detection of unpacking of code in memory during execution of the malware sample in the computing environment.

At 508, automatically generating a signature is performed based on an analysis of the monitored changes in memory after the system call event during execution of the malware sample for a predetermined period of time in the computing environment. For example, an extracted payload from the deobfuscated/unpacked code can be submitted for dynamic analysis (e.g., using the dynamic analysis engine (310)) to generate new signatures (e.g., as well as applying existing signatures, such as signatures based on YARA rules).

Remedial Actions

As explained above, various remedial actions can be performed using the disclosed techniques for efficient program deobfuscation through system API instrumentation. For example, signatures can be automatically generated based on the malware binaries identified in the automatically unpacked code/binaries during malware execution in the malware analysis environment (e.g., performing a static analysis of the unpacked code/binaries to generate pattern-based signatures, such as signatures based on YARA rules). The signatures can be distributed to security devices (e.g., security/firewall appliances), host security software/agents, and/or a security service for enforcement based on the signature (e.g., applied to deobfuscated/unpacked payloads).

As another example, the extracted payload from the deobfuscated/unpacked code/binaries can be submitted for dynamic analysis (e.g., using the dynamic engine (310)) to generate new signatures such as dynamic/behavior signatures (e.g., as well as applying existing signatures, such as signatures based on YARA rules).

As yet another example, the disclosed techniques can be applied to cluster malware families that may utilize different obfuscation or packing approaches to conceal identical or similar malware code/binaries. The automatically unpacked code/binaries detected during malware execution can be compared across malware samples to facilitate clustering of such malware families (e.g., identifying malware families using YARA rules or similar techniques).

Deduplicating Malware

Signature-based detection of malware is prevalent in the security industry, and in response, malware authors are increasingly "repacking" their malware to thwart easy detection. In particular, malware authors will employ data obfuscation and other techniques that will result in programs that have identical (malicious) functionality (and are typically created using identical source code) having very different executable files, which will yield very different signatures (e.g., different MD5, SHA-256, etc. signatures).

Suppose the author of malware 130 repacks the malware three times, sending different copies of malware 130 to each of clients 104, 106, and 108, respectively. The functionality of each copy will be the same (e.g., contact C&C server 150 and execute a cryptocurrency mining program or some other nefarious activity), but to appliance 102, each copy appears to be a different attachment (i.e., each of the three files would have a respective different MD5 or other signature). Further suppose that appliance 102 does not have any signatures stored on it for any of the three received copies of malware 130 (i.e., the MD5 or other signatures of the three copies of malware 130 are not present on any blacklists or whitelists stored on appliance 102), and also that security service 122 (when polled by appliance 102) also does not have any information pertaining to the three attachments. Appliance 102 might accordingly transmit each of the three attachments to security service 122 for processing, before allowing the messages from system 120 to reach any of clients 104-108 (if at all). In this example, security service 122 could wind up performing triple the work (i.e., performing a full set of static/dynamic analysis on each of the three copies of malware 130) than it otherwise would if the author had not employed repacking. In particular, if the author had not employed repacking, service 122 could have evaluated the first copy of malware 130 and reached a determination that the sample was malicious. Where the second and third samples are identical files (i.e., with identical signatures), service 122 would not need to examine the other two copies, and they would instead be flagged (e.g., by platform 102, or service 122, as applicable) as duplicates. However, the second and third copies, if repacked, will appear to be unique samples—and thus potentially require full analysis as well.

Once the second sample has been identified as a duplicate of the first sample (e.g., by a deduplication module 318, or coordinator 304, or another component, as applicable), a variety of actions can be taken. As a first example, additional processing of the second sample can be terminated, saving resources. As a second example, malware samples can be tied back to their sources (e.g., using database 316). For example, suppose the first and second samples are received (e.g., by security service 122) from two different banking institutions. Using conventional signature-based approaches, the two samples would have two different signatures, and could potentially have been created by two different authors. Once it is discovered that the two samples when deobfuscated/unpacked include identical malware binaries, an inference can be made that the author of both samples is the same (and, that the same entity is attacking both banks).

Figure 6:
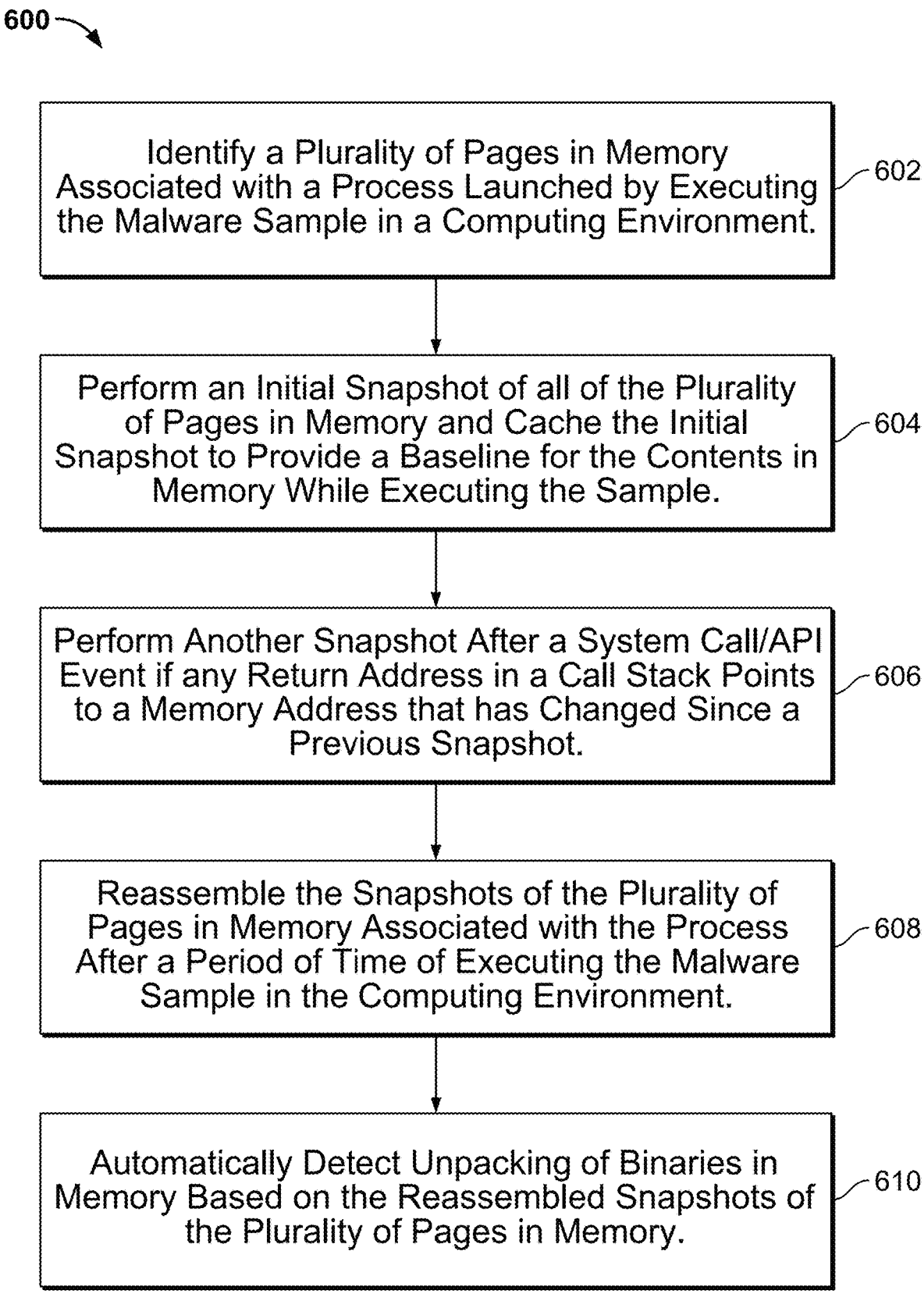
FIG. 6 illustrates another embodiment of a process for efficient program deobfuscation through system API instrumentation.

FIG. 6 illustrates another embodiment of a process for efficient program deobfuscation through system API instrumentation. In various embodiments, process 600 is performed by system 300. The process begins at 602 when identifying a plurality of pages in memory associated with a process launched by executing the malware sample in a computing environment is performed.

At 604, an initial snapshot is performed of all of the plurality of pages in memory associated with the process and the initial snapshot is cached to provide a baseline for the contents in memory while executing the sample. For example, the initial snapshot can be stored in a page cache (e.g., page cache 326 of FIG. 3).

At 606, another snapshot is performed after a system call/API event if any return address in a call stack points to a memory address that has changed since a previous snapshot (e.g., the baseline snapshot taken at 604). For example, each time one of these functions/selected system APIs is called, the call stack can be inspected to determine whether any return address in the call stack points to a memory address that has changed since the first/previous image of memory was performed. In an example implementation, this can be performed by walking the stack to check all return addresses if code existed in a previous snapshot of memory, and if no return addresses point to changes in code, then the malware analysis processing can continue (iteratively) without taking another snapshot of one or more memory pages. However, if a return address points to changes in code, then another snapshot of the relevant page(s) in memory can be performed, as similarly described above.

At 608, reassembling the snapshots of the plurality of pages in memory associated with the process after a period of time of executing the malware sample in the computing environment is performed. For example, the snapshots of the plurality of pages in memory can include pages that were modified during malware sample execution in the computing environment after one or more system call/API events as similarly described above.

Finally, at 610, automatically detecting unpacking of binaries in memory based on the reassembled snapshots of the plurality of pages in memory is performed. For example, a static analysis can be performed (e.g., using static analysis engine(s) 306 of FIG. 3) on the reassembled memory pages to identify an executable associated with the unpacked malware binary as similarly described above.

Figure 7:
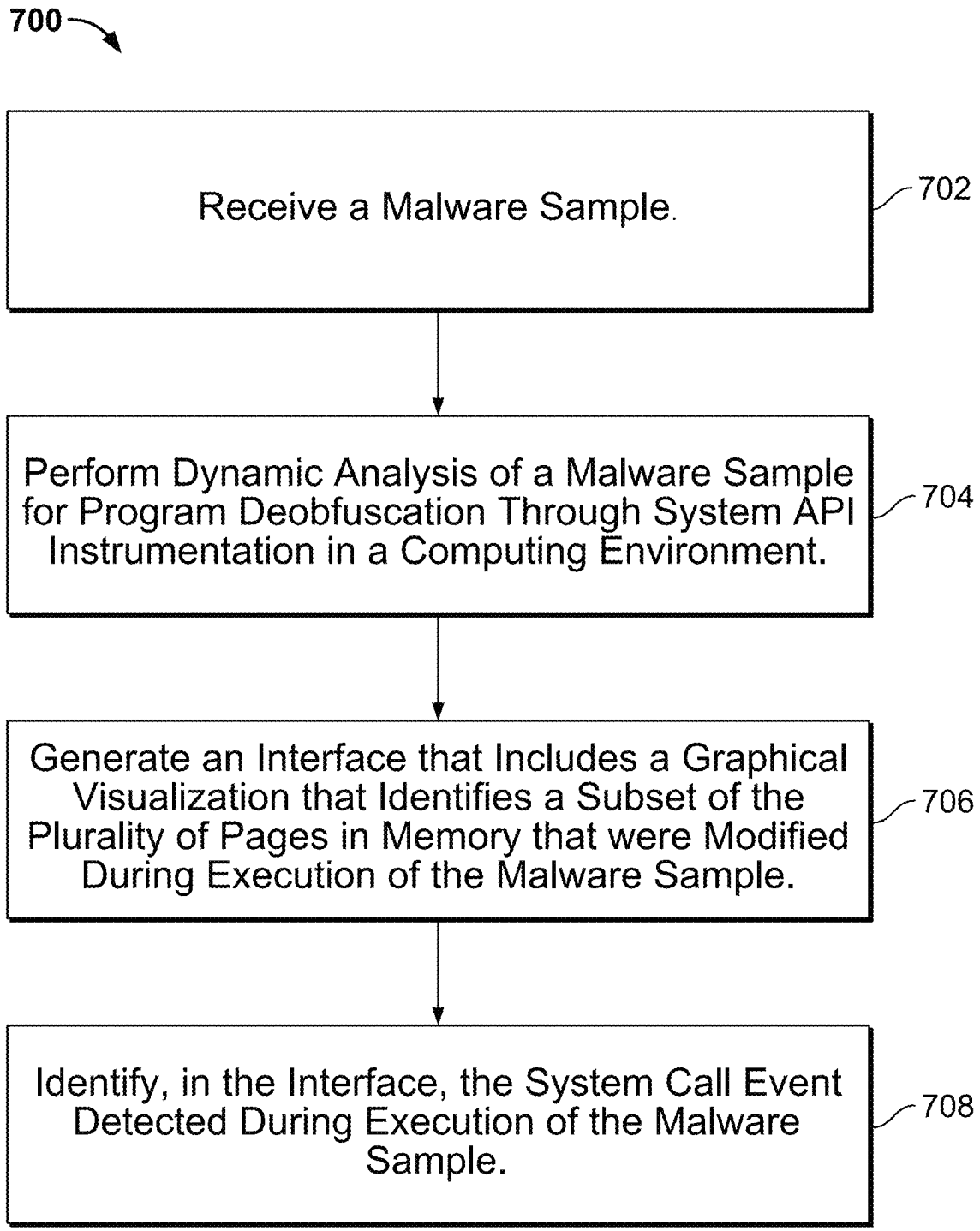
FIG. 7 illustrates an embodiment of a process for generating an interface for efficient program deobfuscation through system API instrumentation.

Processes for Generating an Interface for Efficient Program Deobfuscation Through System API Instrumentation FIG. 7 illustrates an embodiment of a process for generating an interface for efficient program deobfuscation through system API instrumentation. In various embodiments, process 700 is performed by system 300. The process begins at 702 when a malware sample (e.g., candidate malware) is received. As one example, candidate malware is received at 702 when an email (including an attachment) is received by data appliance 102 from system 120. As another example, data appliance 102 can be configured to transmit the attachment to service 122 for analysis. In that scenario, the candidate malware is received by service 122 at 702. As yet another example, candidate malware can be received at 702 as part of a batch operation (e.g., where cloud security service 122 receives a variety of malware samples over a period of time and a batch of received samples is provided to virtual machine server 124 for processing—with virtual machine server 124 receiving the batch at 702). Further, the batch operation can be repeated (e.g., on the same set of samples—or on a set that includes at least some of the same samples as previous batches).

At 704, dynamic analysis of a malware sample for program deobfuscation through system API instrumentation is performed in a computing environment. For example, the computing environment can be implemented initializing a virtual machine instance (e.g., an instrumented virtual environment, such as similarly described above with respect to 112 and 124 of FIG. 1). The virtual environment is instrumented, as applicable, such that behaviors observed while the application is executing are logged and/or monitored (e.g., intercepting/hooking system call/API events) as similarly described above.

At 706, an interface is generated that includes a graphical visualization of a plurality of pages in memory associated with a process launched during execution of the malware sample in the computing environment, in which the graphical visualization of the plurality of pages in memory indicates a subset of the plurality of pages in memory that were modified after a system call event that was intercepted through the system API instrumentation in the computing environment. For example, a graphical visualization of a plurality of pages in memory associated with a process launched to identify a subset of the plurality of pages in memory that were modified during execution of the malware sample in the computing environment is illustrated at 424 of FIG. 4B as similarly described above.

Finally, at 708, the system call event detected during execution of the malware sample in the computing environment is identified in the interface. For example, a system call (API) event is illustrated at 426 of FIG. 4B as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
perform dynamic analysis of a malware sample for program deobfuscation through system API instrumentation in a computing environment, wherein a plurality of pages in memory associated with a process launched by executing the malware sample are identified and monitored for changes after one or more system call events during execution of the malware sample for a predetermined period of time in the computing environment, and wherein an output of the monitored changes in memory after the system call event during execution of the malware sample for a predetermined period of time in the computing environment are reassembled and analyzed to identify a potential malware binary; and
generate an interface that includes a graphical visualization of a plurality of pages in memory associated with a process launched during execution of the malware sample in the computing environment, wherein the graphical visualization of the plurality of pages in memory indicates a subset of the plurality of pages in memory that were modified after a system call event that was intercepted through the system API instrumentation in the computing environment; and
a memory coupled to the processor and configured to provide the processor with instructions.

2. The system recited in claim 1, wherein the computing environment comprises a virtual machine instance.

3. The system recited in claim 1, wherein the processor is further configured to:
identify, in the interface, the system call event detected during execution of the malware sample in the computing environment.

4. The system recited in claim 1, wherein the processor is further configured to:
monitor changes in memory after the system call event during execution of the malware sample in the computing environment, wherein monitoring changes in memory after the system call event during execution of the malware sample in the computing environment further comprises:
identify a plurality of pages in memory associated with a process launched by executing the malware sample in the computing environment;
perform an initial snapshot of all of the plurality of pages in memory associated with the process at initial time to and cache the initial snapshot of all of the plurality of pages in memory to provide a baseline for contents in memory while executing the malware sample in the computing environment;

perform another snapshot of all of the plurality of pages in memory associated with the process at subsequent time to after the system call event in response to detecting a return address in a call stack points to a memory address that has changed since the initial snapshot;

reassemble snapshots of the plurality of pages in memory associated with the process after executing the malware sample for a predetermined period of time in the computing environment; and automatically detect unpacking of binaries in memory based on a static analysis of the reassembled snapshots of the plurality of pages in memory; and a memory coupled to the processor and configured to provide the processor with instructions.

5. The system recited in claim 1, wherein the potential malware binary is submitted for dynamic analysis and/or static analysis.

6. The system recited in claim 1, wherein the processor is further configured to:
receive a plurality of malware samples; and
deduplicate the plurality of malware samples.

7. The system recited in claim 1, wherein the processor is further configured to:
receive a plurality of malware samples;
deduplicate the plurality of malware samples to output a first malware sample; and
execute the first malware sample in the computing environment.

8. A method, comprising:
performing dynamic analysis of a malware sample for program deobfuscation through system API instrumentation in a computing environment, wherein a plurality of pages in memory associated with a process launched by executing the malware sample are identified and monitored for changes after one or more system call events during execution of the malware sample for a predetermined period of time in the computing environment, and wherein an output of the monitored changes in memory after the system call event during execution of the malware sample for a predetermined period of time in the computing environment are reassembled and analyzed to identify a potential malware binary; and generating an interface that includes a graphical visualization of a plurality of pages in memory associated with a process launched during execution of the malware sample in the computing environment, wherein the graphical visualization of the plurality of pages in memory indicates a subset of the plurality of pages in memory that were modified after a system call event that was intercepted through the system API instrumentation in the computing environment.

9. The method of claim 8, wherein the computing environment comprises a virtual machine instance.

10. The method of claim 8, further comprising:
identifying, in the interface, the system call event detected during execution of the malware sample in the computing environment.

11. The method of claim 8, further comprising:
monitoring changes in memory after a system call event during execution of a malware sample in a computing environment, wherein monitoring changes in memory after the system call event during execution of the malware sample in the computing environment further comprises:

identifying a plurality of pages in memory associated with a process launched by executing the malware sample in the computing environment;

performing an initial snapshot of all of the plurality of pages in memory associated with the process at initial time to and cache the initial snapshot of all of the plurality of pages in memory to provide a baseline for contents in memory while executing the malware sample in the computing environment;

performing another snapshot of all of the plurality of pages in memory associated with the process at subsequent time to after the system call event in response to detecting a return address in a call stack points to a memory address that has changed since the initial snapshot;

reassembling snapshots of the plurality of pages in memory associated with the process after executing the malware sample for a predetermined period of time in the computing environment; and automatically detecting unpacking of binaries in memory based on a static analysis of the reassembled snapshots of the plurality of pages in memory.

12. The method of claim 11, wherein the potential malware binary is submitted for dynamic analysis and/or static analysis.

13. The method of claim 8, further comprising:
receiving a plurality of malware samples; and
deduplicating the plurality of malware samples.

14. The method of claim 8, further comprising:
receiving a plurality of malware samples;
deduplicating the plurality of malware samples to output a first malware sample; and
executing the first malware sample in the computing environment.

15. A computer program product, the computer program product being embodied in a tangible non-transitory computer readable storage medium and comprising computer instructions for:
performing dynamic analysis of a malware sample for program deobfuscation through system API instrumentation in a computing environment, wherein a plurality of pages in memory associated with a process launched by executing the malware sample are identified and monitored for changes after one or more system call events during execution of the malware sample for a predetermined period of time in the computing environment, and wherein an output of the monitored changes in memory after the system call event during execution of the malware sample for a predetermined period of time in the computing environment are reassembled and analyzed to identify a potential malware binary; and generating an interface that includes a graphical visualization of a plurality of pages in memory associated with a process launched during execution of the malware sample in the computing environment, wherein the graphical visualization of the plurality of pages in memory indicates a subset of the plurality of pages in memory that were modified after a system call event that was intercepted through the system API instrumentation in the computing environment.

16. The computer program product recited in claim 15, further comprising computer instructions for:

identifying, in the interface, the system call event detected during execution of the malware sample in the computing environment.

17. The computer program product recited in claim 15, further comprising computer instructions for:

monitoring changes in memory after a system call event during execution of a malware sample in a computing environment, wherein monitoring changes in memory after the system call event during execution of the malware sample in the computing environment further comprises:

identifying a plurality of pages in memory associated with a process launched by executing the malware sample in the computing environment;

performing an initial snapshot of all of the plurality of pages in memory associated with the process at initial time to and cache the initial snapshot of all of the plurality of pages in memory to provide a baseline for contents in memory while executing the malware sample in the computing environment;

performing another snapshot of all of the plurality of pages in memory associated with the process at subsequent time to after the system call event in response to detecting a return address in a call stack points to a memory address that has changed since the initial snapshot;

reassembling snapshots of the plurality of pages in memory associated with the process after executing the malware sample for a predetermined period of time in the computing environment; and automatically detecting unpacking of binaries in memory based on a static analysis of the reassembled snapshots of the plurality of pages in memory.

18. The computer program product recited in claim 17, wherein the potential malware binary is submitted for dynamic analysis and/or static analysis.

19. The computer program product recited in claim 15, further comprising computer instructions for:
receiving a plurality of malware samples; and
deduplicating the plurality of malware samples.

20. The computer program product recited in claim 15, further comprising computer instructions for:
receiving a plurality of malware samples;
deduplicating the plurality of malware samples to output a first malware sample; and
executing the first malware sample in the computing environment.

* * * * *

UNITED STATES PATENT AND TRADEMARK OFFICE
CERTIFICATE OF CORRECTION

PATENT NO. : 10,956,570 B2
APPLICATION NO. : 16/725748
DATED : March 23, 2021
INVENTOR(S) : Robert Jung It is certified that error appears in the above-identified patent and that said Letters Patent is hereby corrected as shown below:

In the Specification

In Column 4, Line 26, delete "OllyyDumpEx" and insert --OllyDumpEx--, therefor.

In the Claims

In Column 16, Line(s) 66, Claim 4, after "time", delete "to" and insert --$t_0$--, therefor.
In Column 17, Line(s) 5, Claim 4, after "time", delete "to" and insert --$t_n$--, therefor.
In Column 18, Line(s) 9, Claim 11, after "time", delete "to" and insert --$t_0$--, therefor.
In Column 18, Line(s) 16, Claim 11, after "time", delete "to" and insert --$t_n$--, therefor.
In Column 19, Line(s) 18, Claim 17, after "time", delete "to" and insert --$t_0$--, therefor.
In Column 19, Line(s) 24, Claim 17, after "time", delete "to" and insert --$t_n$--, therefor.

Signed and Sealed this
Twenty-eighth Day of June, 2022

Katherine Kelly Vidal
*Director of the United States Patent and Trademark Office*